(12) United States Patent
Chen

(10) Patent No.: US 10,492,575 B2
(45) Date of Patent: *Dec. 3, 2019

(54) CLOSURE MECHANISM FOR JEWELRY

(71) Applicant: PAJ, Inc., Dallas, TX (US)

(72) Inventor: Felix Chen, Dallas, TX (US)

(73) Assignee: PAJ, INC., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,564

(22) Filed: Jul. 16, 2018

(65) Prior Publication Data

US 2019/0053585 A1    Feb. 21, 2019

Related U.S. Application Data

(62) Division of application No. 15/680,394, filed on Aug. 18, 2017, now Pat. No. 10,154,709.

(51) Int. Cl.
*A44C 13/00* (2006.01)
*A44C 15/00* (2006.01)
(Continued)

(52) U.S. Cl.
CPC .......... *A44C 5/2076* (2013.01); *A44C 5/2033* (2013.01); *A44C 15/005* (2013.01);
(Continued)

(58) Field of Classification Search
CPC ... A44C 5/2033; A44C 5/2057; A44C 5/2061; A44C 5/209; A44C 5/18; A44C 5/20; A44C 5/2019; A44C 13/00; A44C 17/0216; A44C 17/0225; A44C 3/008; F16B 2/10; F16B 45/02; F16B 45/06; A44D 2201/06; Y10T 24/3902; Y10T 24/45361; Y10T 24/44538; Y10T 24/4453; Y10T 24/4511; Y10T 24/4501; Y10T 24/45016; Y10T 24/45099; Y10T 24/45251; Y10T 24/45277; Y10T 24/45288; Y10T 24/45681; Y10T 24/4782; Y10T 24/44291;
(Continued)

(56) References Cited

U.S. PATENT DOCUMENTS

| 4,113,156 A | 9/1978 | Brito |
| 5,138,855 A | 8/1992 | Faris |

(Continued)

FOREIGN PATENT DOCUMENTS

SU    1623595 A1    1/1991

OTHER PUBLICATIONS

International Search Report and Written Opinion dated Jul. 12, 2018 in corresponding International Application No. PCT/US2018/025381.

*Primary Examiner* — Jack W Lavinder
(74) *Attorney, Agent, or Firm* — Ostrolenk Faber LLP

(57) ABSTRACT

A jewelry clasp includes a lower arm and an upper arm that are hingedly joined to each other at one respective ends thereof. A locking pin is provided adjacent a second end of the upper arm and the locking pin extends toward the respective second end of the lower arm and locked inside a locking receptacle formed adjacent a second distal end of the lower arm. The locking receptacle contains two spring wires that extend transversely to the direction of the locking receptacle, the spring wires being spaced from each other at a distance slightly smaller than the diametrical size of a pin head of the locking pin. The clasp can be used as a general jewelry closure device.

8 Claims, 4 Drawing Sheets

(51) Int. Cl.
*A44C 5/20* (2006.01)
*A44C 25/00* (2006.01)
(52) U.S. Cl.
CPC .......... *A44C 25/007* (2013.01); *A44C 5/2071* (2013.01); *A44C 25/001* (2013.01); *A44D 2200/10* (2013.01)
(58) Field of Classification Search
CPC ............. Y10T 24/3493; Y10T 24/3427; Y10T 24/3484; Y10T 24/44239; Y24T 24/4511; A44B 9/16; A44B 9/18; A44B 9/08; B65D 33/1675
USPC ........ 63/3.1, 29.1, 40, 43, 33, 19; 70/2, 160, 70/159; 24/DIG. 46, DIG. 47, DIG. 51, 24/376, 483, 489, 517–520, 66.1, 66.8, 24/66.13, 66.11, 66.5, 49.1, 30.5 R, 3.6; 132/278, 279
See application file for complete search history.

(56) References Cited

U.S. PATENT DOCUMENTS

| | | |
|---|---|---|
| 5,577,396 A | 11/1996 | Cannon |
| 2015/0027167 A1 | 1/2015 | Huynh |

CLOSURE MECHANISM FOR JEWELRY

CROSS-REFERENCE TO RELATED APPLICATION

The present application is a divisional of U.S. patent application Ser. No. 15/680,394, filed Aug. 18, 2017 in the name of Felix Chen, and entitled "CLOSURE MECHANISM FOR JEWELRY," the entire contents of which are incorporated herein by reference.

BACKGROUND OF THE INVENTION

The present invention generally relates to closure mechanisms for jewelry and, more particularly, to a closure mechanism useable with necklaces, charms, bracelets, rings, earrings, wristbands etc. that provide a more secure and single-step closure mechanism. The closure mechanism can be provided, for example, as a clasp mechanism.

A function of a jewelry closure mechanisms, clasps and the like is not only to make initial contact between the ends of the necklace or to allow easier interchange of charms and necklaces and like functions, but also to ensure that during the lifetime use of the jewelry piece, the clasp/closing mechanism remains secure, easy to use and not prone to accidentally open, which can result in expensive jewelry becoming lost.

In the prior art, oftentimes jewelry closure pieces and clasps are made of gold material which is a comparatively softer material with less springiness and, in which, repeated use of the clasp and closure mechanism can result in its weakening and eventual loss of function.

SUMMARY OF THE INVENTION

Accordingly, it is an object of the present invention to provide a jewelry closure that avoids some of the drawbacks of the prior art.

It is another object of the present invention to provide a jewelry closure that uses a single reliable closure mechanism that facilitates its use.

It is yet another object of the present invention to provide a jewelry closure which is both ornamental and highly reliable and far less likely to lose its functionality with repeated use of the closure mechanism.

The foregoing and other objects of the invention are realized in accordance with one preferred embodiment of the present invention that has been reduced to practice in the form of a jewelry clasp including: a lower arm and an upper arm, hingedly joined to each other at a first respective end thereof; a locking pin provided adjacent a second end of the upper arm, and extending toward a respective second end of the lower arm, the locking pin comprising at a distal end thereof a pin head; and a locking receptacle formed adjacent the second end of the lower arm, the locking receptacle containing therein at least one spring wire configured to resiliently deflect when the pin head of the locking pin is pushed into the locking receptacle, allowing the locking pin to move past the at least one spring wire so as to positively lock the second respective ends of the lower arm and the upper arm to each other. Preferably, the at least one spring wire comprises first and second spring wires extending substantially parallel to each other in the locking receptacle and spaced apart at a distance less than a diametrical size associated with the pin head, and the pin head is spherically shaped.

Preferably, a holding strip is attached at one end thereof to an underside of the upper arm and has a free distal end with a pin opening therein, and the locking pin passing through said pin opening, and the lower arm and the upper arm have respective, curved outer surfaces. A jewelry ornament, for example a jewelry charm, is attached to the locking pin, between the holding strip and the underside of the upper arm. Preferably, each of the lower arm and the upper arm comprises a respective hinge and including a common hinge pin passing through and hingedly connecting the lower arm and the upper arm. An interior space is defined between the lower arm, the upper arm and the locking pin and for the passage there-through and for removeably receiving a jewelry piece, for example jewelry charm, a jewelry necklace, a jewelry bracelet, a jewelry pendant and the like.

In one embodiment, the locking pin is threadedly attached to the upper arm or the locking pin is attached to the upper arm via a pin cap.

In its broader concept, the invention applies to jewelry closure mechanisms that require no more than first and second arms, one of which contains the locking pin and the other of which contains the locking receptacle, without the arms being hinged to each other. Furthermore, the two retaining spring wires may be pre-cast into the body of the second arm, passing inside the locking receptacle. The closure device can be used with any of the aforementioned jewelry pieces including in rings and earrings and the like. In one embodiment, the aforementioned clasping structure can be used on top of a ring and presented as a jewelry locket, in which a lid is openable, exposing a pocket that can then be closed safely without opening.

Other features and advantages of the present invention will become apparent from the following description of the invention which refers to the accompanying drawings.

DETAILED DESCRIPTION OF EMBODIMENTS OF THE INVENTION

Figure 1:
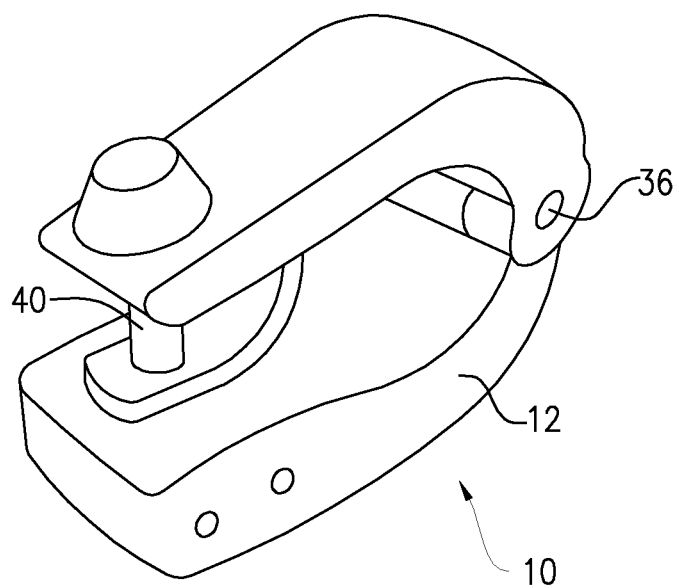
FIG. 1 is a perspective showing the jewelry closure mechanism of the present invention, formed as a clasp.
Figure 3A:
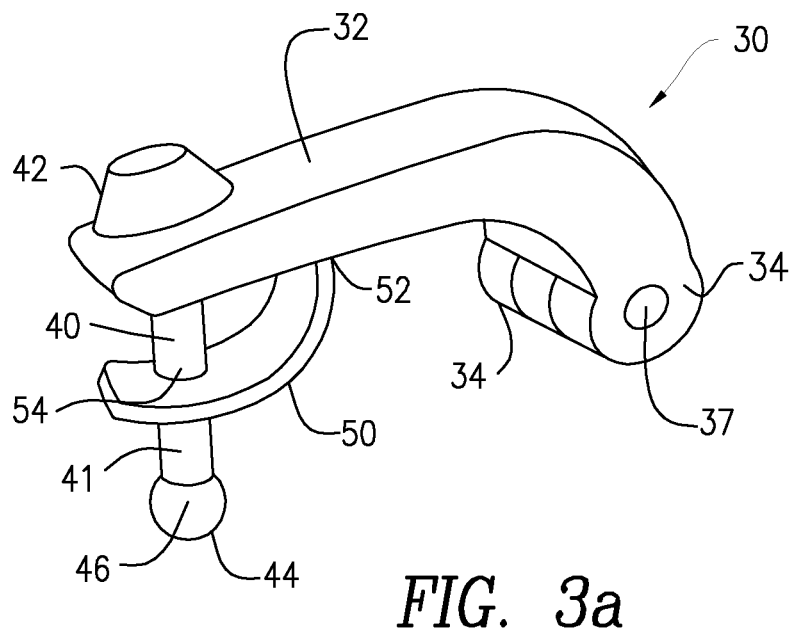
FIGS. 3a, 3b and 3c provide an exploded, disassembled and perspective depiction of the components of the jewelry clasp of FIG. 1.
Figure 3B:
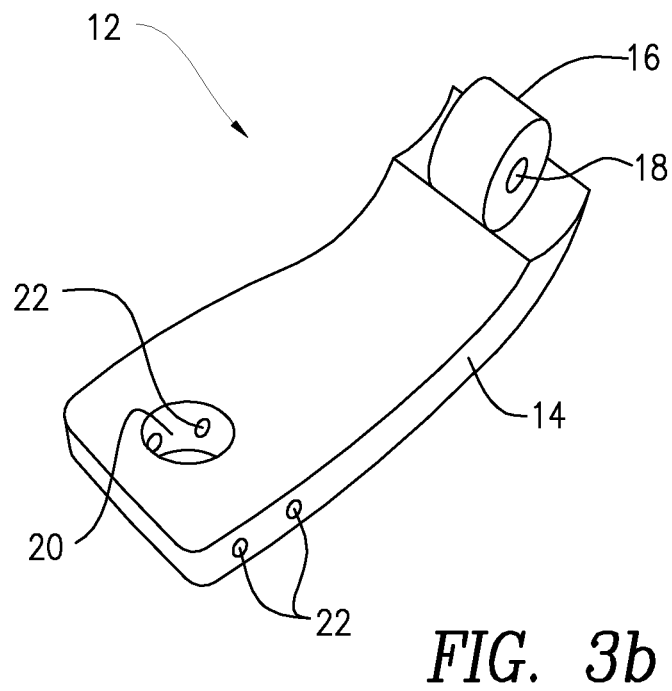

With initial reference to FIGS. 1, 3a and 3b, the primary components of the overall jewelry clasp 10 include a base arm 12, a swinging upper arm 30, both hingedly interconnected at one side thereof by a hinge 36. The opposed distal ends of the base arm 12 and the upper arm 30 are closeable by a locking mechanism 40.

Figure 5:
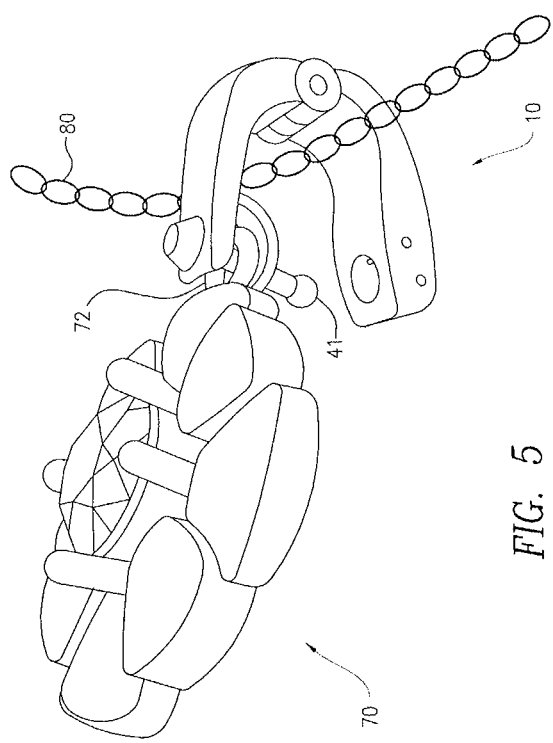
FIG. 5 is a perspective showing jewelry ornaments or pieces used with the clasp of the present invention.

A glance at FIG. 5 enables appreciating one mode of use of the jewelry clasp 10, in which a chain or a bracelet component 80 can be easily placed between the closeable arms of the jewelry clasp and locked therein. In addition, the jewelry clasp 10 can permanently (or removeably) hold a jewelry charm 70 that has a ring 72 that is secured by the locking pin 41.

Figure 3C:
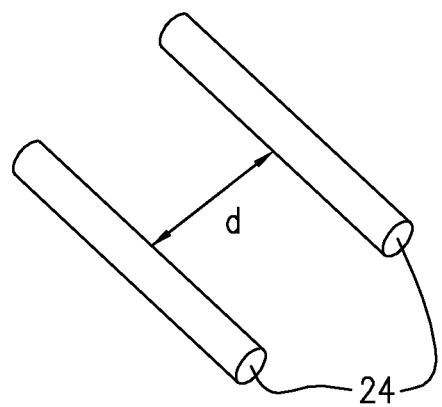

More specifically, as can be seen in the disassembled drawings in FIGS. 3a, 3b and 3c, the base arm 12 comprises a body 14, curved on the outside toward the hinge 36 and provided with a cylindrically shaped hinge piece 16 with a bolt hole 18. A through-going opening 20 at the distal end of the base arm 12 is designed to receive the bulbous or spherical locking pin head 44 (of the upper arm 30) which pin head is sized to have a width-wise extending diameter 46 that just barely fits through the opening 20. The sidewise-penetrating orifices 22 are spaced relative to each other by a distance "d" (FIG. 3c), which distance is just slightly smaller than the diameter of the pin head 44. The orifices 22 receive a pair of pins or wires 24.

Figure 2:
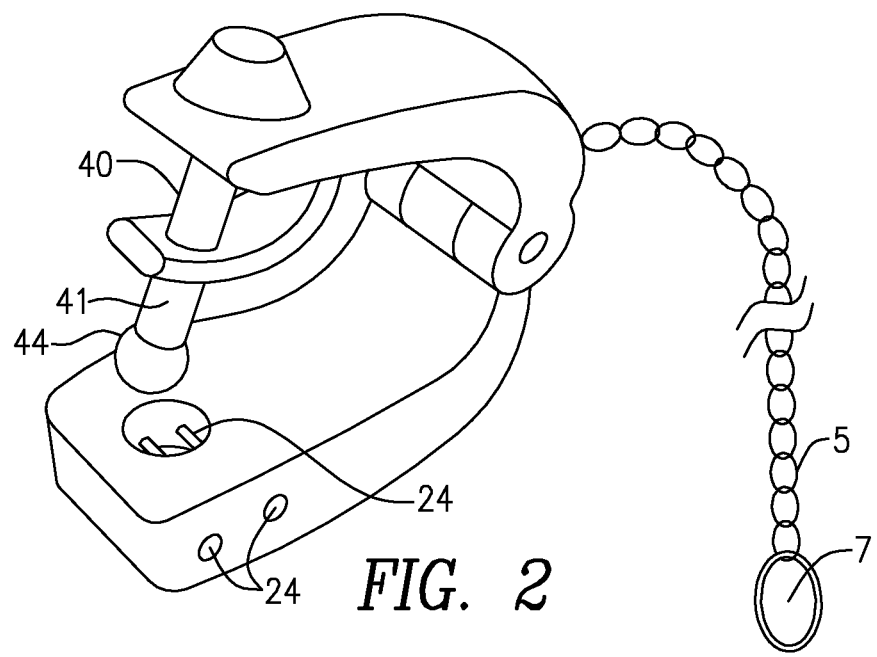
FIG. 2 is another perspective of the invention, showing the jewelry clasp in an opened position.

Turning to FIG. 3a, the upper clasp arm 30 has an outer curved surface 32, and at one distal end thereof the hinge components 34, both containing a through-going hinge orifices 37, and being spaced from each other by the thickness of the hinge component 16 of the base arm 12. When the hinge components of the upper and lower clasp arms are assembled and a pin 37 is passed there-through, these arms hingedly swing relatively to each other as illustrated in FIG. 2.

In FIG. 3a, at the openable end of the jewelry clasp, the pin 41 is passed through an opening 54 in the arcuate charm holder 50, which holder 50 is affixed to the bottom surface of the upper arm 30, at 52. The pin passes through another opening (not shown) in the upper arm and secured with a cap 42. The holding ring 72 of the charm 70 can be inserted into the space between the charm holder 50 and the upper arm 32 at the time that the pin 41 is attached, or at any time. For example, the pin opening (not shown) can be a threaded opening and the pin 41 might have a threaded end (opposite to its locking pin 44) so it can be threaded into the upper arm 32. Alternatively, cap 42 might contain the internal threads and the diameter of the opening might be slightly smaller than the diameter of the pin 41, to fix the position of the pin 41 relative to the upper arm 32.

In everyday use, the charm 72 might be permanently affixed to the locking pin 41 as shown in FIG. 5, and this assembly, consisting of the charm 70 and the jewelry clasp 10, can be attached to the chain 80 or to a bracelet or the like. In fact, in the case of a bracelet, many such charms can be hung on a wrist bracelet, a necklace and the like.

Preferably, the wires 24 extending in the locking opening 20 have their ends immovably secured in the orifices 22 to prevent their sliding inside the orifices and are made of material different than gold, for example stainless wire, that has the strength and resiliency (even at very low wire thicknesses) to withstand the repeated flexing during closing (and opening) of the clasp. Similarly, the locking pin 41 can similarly be made from material other than gold to assure that the bulbous locking pin 44 will not wear down over many years of use. These components do not normally come in contact with the human skin and therefore do not present issues of skin sensitiveness and the like.

The jewelry locking clasp described above can also be used as an earring piece, in which case the locking pin 41 would likely be made of gold, while the wires 24 can be still made of stainless steel, without causing any discomfort or rashes in people having very sensitive ears, etc.

With reference to FIG. 2, when the clasp 10 is used as a general purpose closure device, a chain or necklace 5 has one end thereof attached to one of the two arms while an opposite end of the chain 5 has a ring 7 with an opening large enough so that it can be placed over the locking receptacle with the bulb 44 passing through the ring 7 and allowing the bracelet or necklace 5 or the like to be worn around ones wrist or as a necklace that is worn around one's neck.

While the invention has been described relative to the resilient pins 24 extending into the locking receptacle by being inserted through orifices 22, in fact, the wires 24 may be placed into a (lost wax) mold, in such a way that the wires 24 are precast together with the material of the lower arm 12 so that they are permanently in place and do not require special assembly, which saves on cost and may contribute to improving the overall aesthetics of the closure device.

Figure 4:
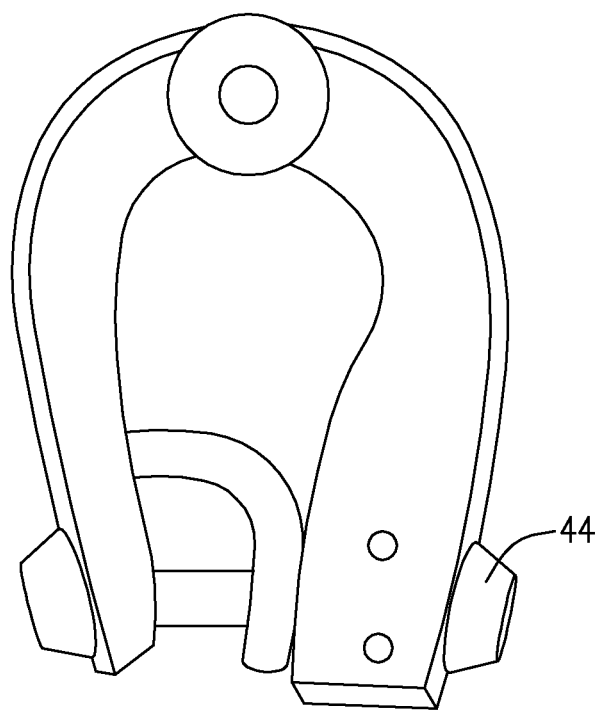
FIG. 4 provides a side-view of the jewelry clasp of FIG. 1.

As can be appreciated from the side view of FIG. 4, the jewelry clasp 10 is dimensioned in such a way that merely pressing together the two arms 12, 30 will cause the locking pin 41 to pass through the locking opening 20, snap closing behind the retaining wires 24, without any looseness as the distal end of the charm holder 50 provides a counterforce in the opening direction. The clasp 10 is easily openable by merely pressing on the locking head 44, which will cause the overall pin 41 to snap open, once the locking bulb 44 has passed the halfway point between the wires 24.

The clasp mechanism concept of the present invention utilizes a single closure, with little risk of this clasp opening accidentally, owing to the very strong positive locking force exerted by the wires 24, which disposes of the need for a double closure mechanism, e.g. a safety bar or the like being swung around the main closing mechanism.

Figure 6:
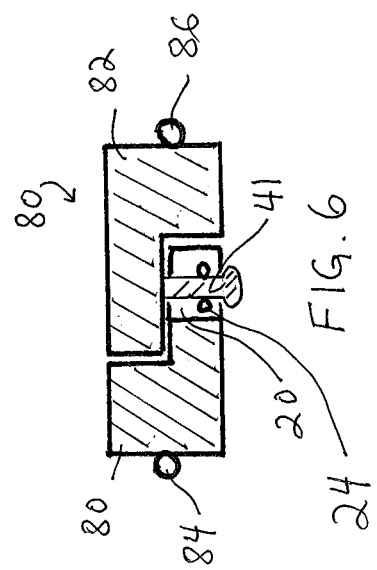
FIG. 6 is a diagrammatic depiction of the basic concept of the invention, formed as a general purpose closure piece for jewelry.

With reference to FIG. 6, when used as a general jewelry closure device 80, the invention can be described as consisting of first and second arms 80,82 where the piece 82 carries the aforementioned locking pin 41 and the other arm 80 has the locking receptacle 20 which supports the spring wires 24, as previously described. The overall closure device 80 can be made in extremely small, millimeter sized dimensions. The arms 80,82 have respective attachment rings 84,86. As previously noted, the spring wires can be fabricated of steel wire 0.5 mm in diameter and even at smaller diameters, for example 0.25 mm steel wire. Any other hard, high-temperature resistant metal, such as titanium, palladium, platinum and the like may be used.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A jewelry closure, comprising:
   a lower arm and an upper arm, hingedly joined to each other at a first respective end thereof;
   a locking pin provided adjacent a second end of the upper arm, and extending toward a respective second end of the lower arm, the locking pin comprising at a distal end thereof a pin head; and
   a locking receptacle formed adjacent the second end of the lower arm, the locking receptacle containing therein at least one straight spring wire supported at opposed ends in a wall defining said locking receptacle and said straight spring wire being configured to resiliently deflect when the pin head of the locking pin is pushed into the locking receptacle, allowing the locking pin to move past the at least one spring wire so as to positively lock the second respective ends of the lower arm and the upper arm to each other.

2. The jewelry closure of claim 1, wherein the pin head is spherically shaped and including a holding strip attached at one end thereof to an underside of the upper arm and having a free distal end with a pin opening therein, and said locking pin passing through said pin opening.

3. The jewelry closure of claim 2, wherein the jewelry ornament is located between the holding strip and the underside of the upper arm.

4. The jewelry closure of claim 1, further including a jewelry ornament attached to the locking pin.

5. The jewelry closure of claim 4, wherein the jewelry ornament comprises a jewelry charm.

6. The jewelry closure of claim 4, wherein an interior space is defined between the lower arm, the upper arm and the locking pin and for the passage therethrough and for removeably receiving a jewelry piece.

7. The jewelry closure of claim 6, wherein the jewelry piece comprises one of a jewelry charm, a jewelry necklace, a jewelry bracelet, and a jewelry pendant.

8. The jewelry closure of claim 1, wherein the locking pin is attached to the upper arm via a pin cap.

\* \* \* \* \*